April 15, 1952

G. E. DATH ET AL 2,592,663

FRICTION SHOCK ABSORBING MECHANISM
FOR RAILWAY CAR DRAFT RIGGINGS

Filed May 24, 1950

2 SHEETS—SHEET 1

Inventors:
George E. Dath.
Arnold G. Peterson.
By Henry Fuchs
Atty.

April 15, 1952     G. E. DATH ET AL     2,592,663
FRICTION SHOCK ABSORBING MECHANISM
FOR RAILWAY CAR DRAFT RIGGINGS Inventors:
George E. Dath.
Arnold G. Peterson.
By Henry Fuchs.
Atty.

Patented Apr. 15, 1952

2,592,663

UNITED STATES PATENT OFFICE 2,592,663

FRICTION SHOCK ABSORBING MECHANISM FOR RAILWAY CAR DRAFT RIGGINGS

George E. Dath, Mokena, and Arnold G. Peterson, Chicago, Ill., assignors to W. H. Miner, Inc., Chicago, Ill., a corporation of Delaware Application May 24, 1950, Serial No. 163,868

3 Claims. (Cl. 213—34)

This invention relates to improvements in friction shock absorbing mechanisms especially designed for use in connection with draft riggings of railway cars.

One object of the invention is to provide a friction shock absorbing mechanism of the character indicated, comprising a friction casing having interior friction surfaces, friction shoes telescoped within the casing in sliding engagement with the friction surfaces thereof, a wedge pressure transmitting member in wedging engagement with the shoes, and yielding means within the casing opposing inward movement of the shoes, wherein said yielding means comprises a friction shock absorbing unit and an independently acting main spring resistance member, thereby providing high shock absorbing capacity and assuring release of the mechanism, the frictional resistance of the internal shock absorbing unit being added to that of the friction means of the main shock absorbing mechanism, and the restoration of the shoes and wedge of the main shock absorbing mechanism, in release, being made more positive by the independent action of the main spring of the mechanism.

Other objects of the invention will more clearly appear from the description and claims hereinafter following.

Figure 1:
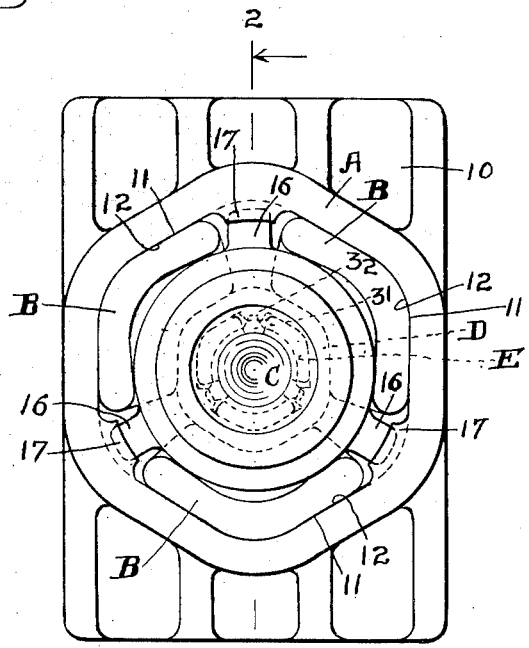
Figure 2:
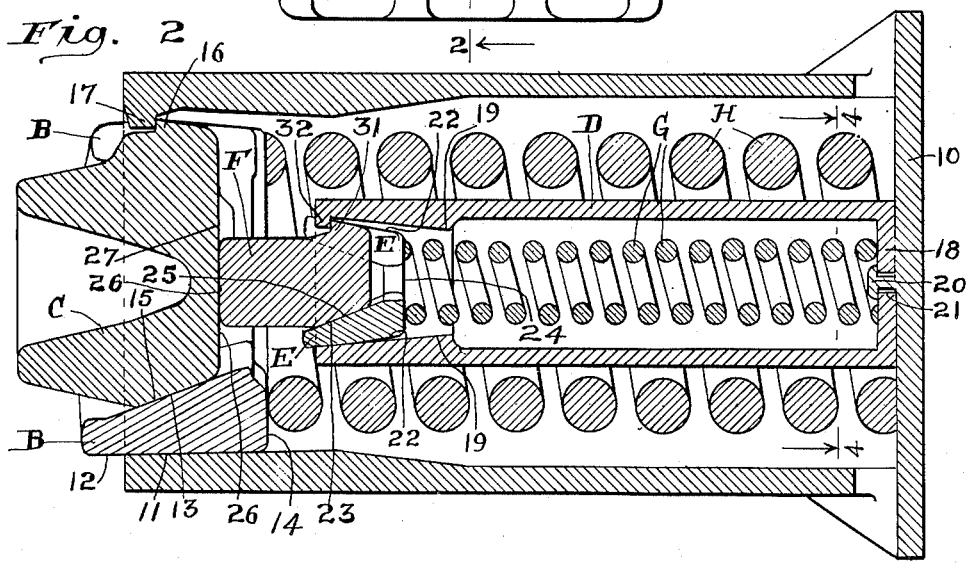
Figure 3:
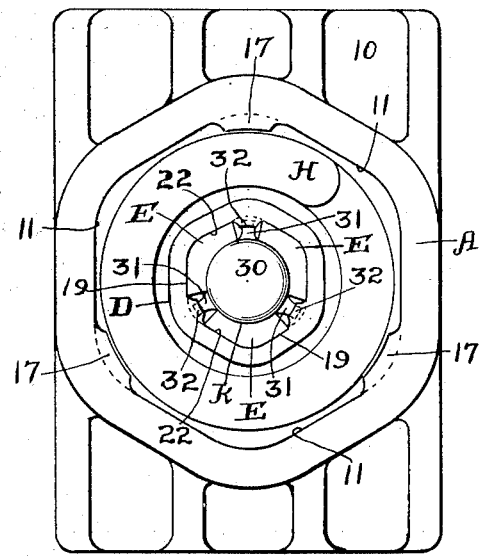
Figure 4:
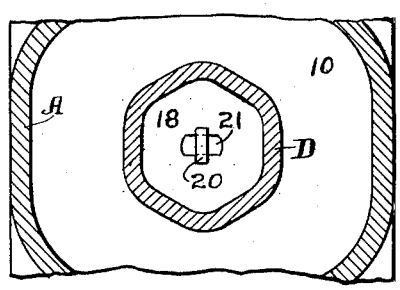
Figure 5:
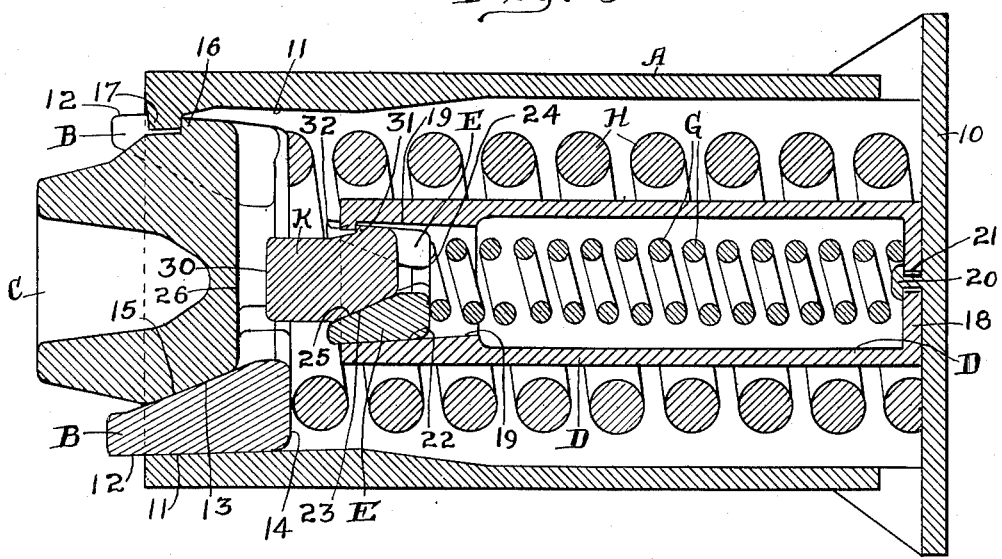

In the accompanying drawings forming a part of this specification, Figure 1 is a front elevational view of the improved friction shock absorbing mechanism. Figure 2 is a sectional view, corresponding substantially to the line 2—2 of Figure 1. Figure 3 is a view similar to Figure 1 with the wedge member removed. Figure 4 is a sectional view, partly broken away, corresponding substantially to the line 4—4 of Figure 2, with the inner and outer springs omitted. Figure 5 is a view similar to Figure 2, illustrating another embodiment of the invention.

Referring first to the embodiment of the invention illustrated in Figures 1 to 4 inclusive, our improved shock absorbing mechanism comprises broadly a main friction casing A, a set of three friction shoes B—B—B in sliding friction engagement with the casing A, a wedge block C in wedging engagement with the shoes, a second friction casing D within the casing A, a second set of three friction shoes E—E—E in sliding engagement with the casing D, a second wedge block F in wedging engagement with the shoes E—E—E, a spring G within the casing D yieldingly opposing inward movement of the shoes E—E—E, and a main spring resistance H surrounding the casing D and directly resisting inward movement of the friction shoes B—B—B.

The casing A is in the form of a tubular member of hexagonal, transverse cross section, open at its front end, as seen in Figure 2, and having a transverse rear wall 10, which is extended outwardly beyond the casing at opposite sides thereof to provide an integral follower member, which is adapted to cooperate, in a well-known manner, with the usual rear stops of a railway draft rigging. At the open end thereof, the casing A is provided with three interior, inwardly converging friction surfaces 11—11—11 of V-shaped, transverse cross section.

The friction shoes B are three in number and are slidingly telescoped within the casing A. Each shoe B has a V-shaped friction surface 12 on its outer side engaged with one of the friction surfaces 11 of the casing. On its inner side, each shoe has a wedge face 13, preferably of V-shaped, transverse cross section. At the rear end, each shoe B presents a flat, transverse abutment face 14 for the main spring H.

The wedge block C is provided with three inwardly converging wedge faces 15—15—15 of V-shaped, transverse section, engaged with the V-shaped wedge faces 13—13—13 of the shoes B—B—B. The wedge block C is further provided with three radially projecting stop lugs 16—16—16, alternated with the wedge faces 15—15—15 of said wedge block, extending between adjacent shoes B—B and engageable in back of three inturned stop lugs 17—17—17 on the casing A, to limit outward movement of said wedge block C and thereby hold the mechanism assembled.

The casing D is disposed within the casing A. This casing D is open at its left hand or front end, as viewed in Figure 2, and has a transverse end wall 18 at its other or rear end, which bears on the wall 10 of the casing A. The casing D is of hexagonal, transverse cross section and has three interior friction surfaces 19—19—19 at its front end, which converge inwardly of the casing. The surfaces 19—19—19 are preferably of V-shaped, transverse cross section. The casing D is locked to the casing A by means of a T-headed lug 20, projecting inwardly from the wall 10 of the casing A and engaged through a transverse slot 21 in the rear wall 18, with the T-head at right angles to said slot and overhanging the wall 18 at opposite sides of said slot.

The shoes E are three in number and are slidingly telescoped within the casing D, each shoe having a V-shaped friction surface 22 on its outer side slidingly engaged with one of the friction surfaces 19 of the casing D. On the inner side, each shoe E is provided with a wedge face 23 of V-shaped, transverse cross section. At their rear ends, the shoes E—E—E have flat, transverse abutment faces 24—24—24 for the spring G.

The wedge block F is engaged between the shoes E—E—E and has three inwardly converging wedge faces 25—25—25 of V-shaped, transverse cross section, engaged respectively with the wedge faces 23—23—23 of the shoes E—E—E. The wedge block F directly abuts the inner end of the main wedge block C, being provided with a flat, front end face 26, which bears on the flat, transverse rear end face 27 of the block C. To limit outward movement of the wedge block F and hold the same assembled with the casing D, the former is provided with three radially projecting stop lugs 31—31—31 alternated with the wedge faces 23—23—23 of said block, extending between adjacent shoes E—E and engageable in back of three inturned stop lugs 32—32—32 on the casing D.

The spring G is in the form of a helical coil, disposed within the casing D and having its opposite ends bearing directly on the wall 18 of the casing D and the inner ends of the friction shoes E—E—E.

The main spring H is in the form of a relatively heavy, helical coil surrounding the casing D, with its front and rear ends bearing directly on the flat abutment faces 14—14—14 of the shoes B—B—B and the inner side of the transverse wall 10 of the casing A.

The operation of our improved shock absorbing mechanism, as illustrated in Figures 1 to 4 inclusive, is as follows: Upon inward movement of the wedge block C, the shoes B—B—B are spread apart and slid inwardly on the friction surfaces of the casing A, yieldingly opposed by the spring H. At the same time, the friction shock absorbing means comprising the casing D, the friction shoes E—E—E, wedge F, and spring G is compressed through engagement of the wedge C with the wedge F. High frictional resistance is thus provided, the frictional resistance of the mechanism comprising the casing D, shoes E—E—E, and wedge F being added to the frictional resistance provided by inward movement of the shoes B—B—B on the friction surfaces of the casing A.

In release of the mechanism, the spring H acting directly on the shoes B—B—B, serves to restore the latter and the wedge block C to the normal full release position shown in Figure 1, independently of the releasing action of the friction shock absorbing mechanism comprising the casing D, shoes E—E—E, wedge F, and spring G, thereby assuring quick release of the mechanism when the actuating pressure is reduced.

Referring next to the embodiment of the invention illustrated in Figure 5, the construction and design is identical with that hereinbefore described, with the exception that the wedge block of the inner friction shock absorbing mechanism, which block is indicated by K, and replaces the block F hereinbefore described, is actuated only after the mechanism has been compressed to a predetermined extent less than the full compression stroke of the mechanism. Inasmuch as all of the parts of the mechanism shown in Figure 5, with the exception of the wedge block K, are identical with the parts of the mechanism hereinbefore described in connection with Figures 1 to 4 inclusive, the same reference characters are used to indicate these parts. As shown in Figure 5, the wedge block K, which engages the shoes E—E—E of the inner friction shock absorbing mechanism, is shorter than the wedge block F hereinbefore described and has its front end face, which is indicated by 30, normally spaced from the inner end of the main wedge block C.

In compression of the mechanism illustrated in Figure 5, the wedge block C is forced inwardly on the friction surfaces of the casing A, resisted by the spring H. After the clearance has been taken up between the wedge block C and the wedge block K, the latter is directly engaged by the former and forced inwardly in unison with the same. During this action, the shoes E—E—E are wedged apart and forced inwardly along the friction surfaces of the casing D, thereby greatly increasing the resistance of the mechanism during the last part of the compression stroke.

We claim:

1. In a friction shock absorbing mechanism, the combination with a friction casing; of friction shoes slidingly telescoped within the casing; a wedge pressure transmitting member in wedging engagement with said shoes; a spring within the casing yieldingly opposing inward movement of said shoes; and frictional resistance means within said casing yieldingly opposing inward movement of said wedge pressure transmitting member, said frictional resistance means including a second friction casing, friction shoes slidingly telescoped within said second casing, a wedge in wedging engagement with said last named shoes, and spring means within said second named casing yieldingly opposing inward movement of said last named shoes.

2. In a friction shock absorbing mechanism, the combination with a friction casing closed at one end and having interior friction surfaces at the other end; of friction shoes telescoped within said casing in sliding engagement with said friction surfaces; a wedge in wedging engagement with the shoes; a spring within the casing bearing at opposite ends on said closed end of the casing and the inner ends of said shoes; a second friction casing within said first named casing having one end closed, said closed end abutting said closed end of said first named casing; friction shoes slidingly telescoped within the opposite end of said second named casing; a second wedge in wedging engagement with said last named shoes, said second named wedge bearing on the inner end of said first named wedge; and a spring within said second named casing yieldingly opposing inward movement of said second named shoes.

3. In a friction shock absorbing mechanism, the combination with a friction casing closed at one end and having interior friction surfaces at the other end; of friction shoes telescoped within said casing in sliding engagement with said friction surfaces; a wedge in wedging engagement with the shoes; a spring within the casing bearing at opposite ends on said closed end of the casing and the inner ends of said shoes; a second friction casing within said first named casing having one end closed, said closed end abutting said closed end of said first named casing; friction shoes slidingly telescoped within the opposite end of said second named casing; a second wedge in wedging engagement with said last named shoes, said second named wedge having its front end spaced inwardly from the inner end of said first named wedge a distance less than the full compression stroke of the mechanism; and a spring within said second named casing yieldingly opposing inward movement of said second named shoes.

GEORGE E. DATH.
ARNOLD G. PETERSON.

REFERENCES CITED

The following references are of record in the file of this patent:

UNITED STATES PATENTS

| Number | Name | Date |
|---|---|---|
| 1,661,145 | Haseltine | Feb. 28, 1928 |